US006902120B1

(12) United States Patent
Chen

(10) Patent No.: US 6,902,120 B1
(45) Date of Patent: Jun. 7, 2005

(54) SPRINKLER PROVIDED WITH A BUILT-IN MECHANISM FOR DISPENSING DETERGENT

(75) Inventor: Chin-Yuan Chen, Chang-Hua Hsien (TW)

(73) Assignee: Shin Tai Spurt Water of the Garden Tools Co., Ltd., Changhua Hsien (TW)

( * ) Notice: Subject to any disclaimer, the term of this patent is extended or adjusted under 35 U.S.C. 154(b) by 0 days.

(21) Appl. No.: 10/742,104

(22) Filed: Dec. 22, 2003

(51) Int. Cl.[7] .......................... B05B 7/26; B05B 7/30; F16K 5/10; B67D 5/60; B67D 5/06

(52) U.S. Cl. ...................... 239/310; 239/317; 239/318; 239/315; 239/530; 239/532; 239/525; 239/407; 251/206; 251/207; 222/129; 222/133; 222/145.1; 222/145.5; 222/144.5

(58) Field of Search ................................ 239/317, 310, 239/318, 315, 530, 532, 525, 407; 251/206, 251/207; 222/129, 133, 145.1, 145.5, 144.5

(56) References Cited

U.S. PATENT DOCUMENTS

| | | | | | |
|---|---|---|---|---|---|
| 2,908,445 | A | * | 10/1959 | Schwartz | 239/317 |
| 3,250,476 | A | * | 5/1966 | Kenk | 239/316 |
| 4,171,169 | A | * | 10/1979 | Williams | 401/41 |
| 4,572,235 | A | * | 2/1986 | Katzer et al. | 137/268 |
| 4,785,850 | A | * | 11/1988 | Sanchez | 137/894 |
| 5,964,415 | A | * | 10/1999 | Hadar | 239/317 |

* cited by examiner

*Primary Examiner*—David A. Scherbel
*Assistant Examiner*—Seth Barney
(74) *Attorney, Agent, or Firm*—Alan D. Kamrath; Nikolai & Mersereau, P.A.

(57) ABSTRACT

A sprinkler includes a handle, a barrel, a nozzle, and a detergent dispensing mechanism. The barrel is fastened at one end with the handle, and at the other end with the nozzle. The detergent dispensing mechanism is fastened to the periphery of the barrel and is contiguous to the handle. The mechanism has a detergent holder and a detergent control switch. The detergent holder is provided with a water hole and a detergent hole, which are in communication with a water duct of the barrel. The detergent control switch is used to open or close the water hole and the detergent hole of the detergent holder in the midst of operation of the sprinkler.

2 Claims, 6 Drawing Sheets

SPRINKLER PROVIDED WITH A BUILT-IN MECHANISM FOR DISPENSING DETERGENT

STATEMENT REGARDING FEDERALLY SPONSORED RESEARCH OR DEVELOPMENT

Not applicable.

RELATED U.S. APPLICATIONS

Not applicable.

REFERENCE TO MICROFICHE APPENDIX

Not applicable.

FIELD OF THE INVENTION

The present invention relates generally to a sprinkler, and more particularly to a sprinkler which is provided with a built-in mechanism for dispensing detergent.

BACKGROUND OF THE INVENTION

The conventional sprinkler is provided with a long barrel to facilitate the washing of a car, wall, window, or the like. The conventional sprinkler is devoid of a built-in mechanism for dispensing detergent and is therefore inefficient. As a result, a separate means is often provided to dispense detergent along with the conventional sprinkler at work.

BRIEF SUMMARY OF THE INVENTION

The primary objective of the present invention is to provide a sprinkler with a built-in mechanism by which detergent is mixed with water so as to enhance the washing efficiency of the sprinkler.

The sprinkler of the present invention comprises a handle, a barrel, a nozzle, and a detergent-dispensing mechanism disposed between the handle and the barrel. The mechanism comprises a detergent holder and a control switch. The detergent holder is provided with a water inlet and a detergent outlet. The control switch is used to regulate communication between the water inlet and the detergent outlet. The detergent can be thus mixed with water at any time in the midst of operation of the sprinkler.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
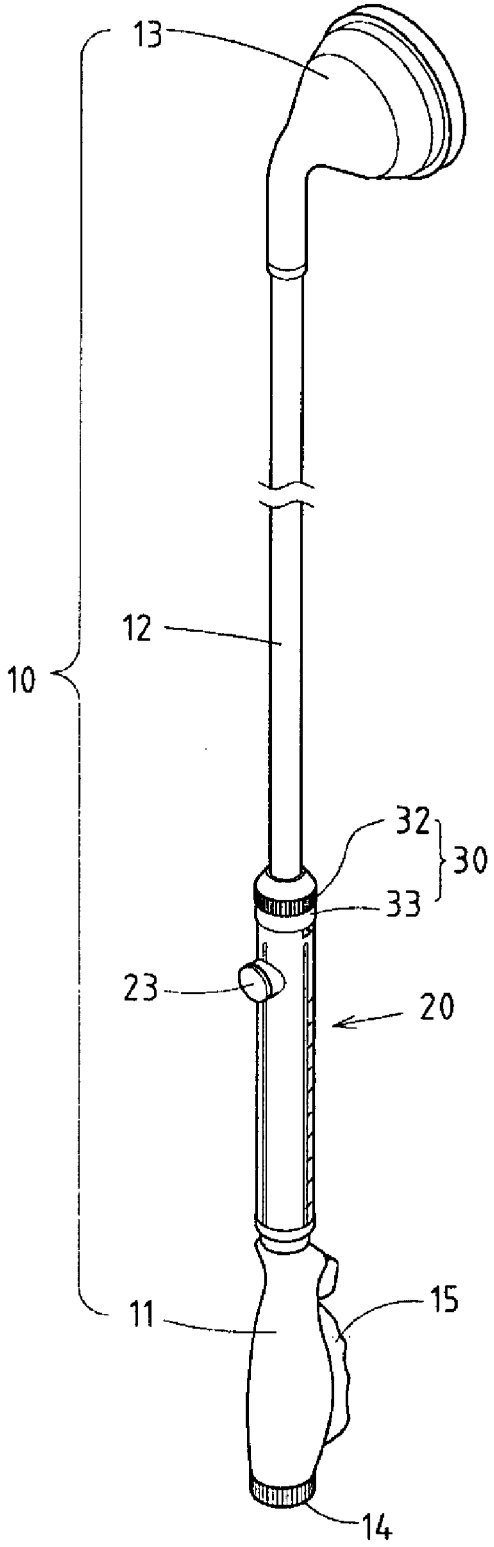
FIG. 1 shows a perspective view of the preferred embodiment of the present invention.
Figure 2:
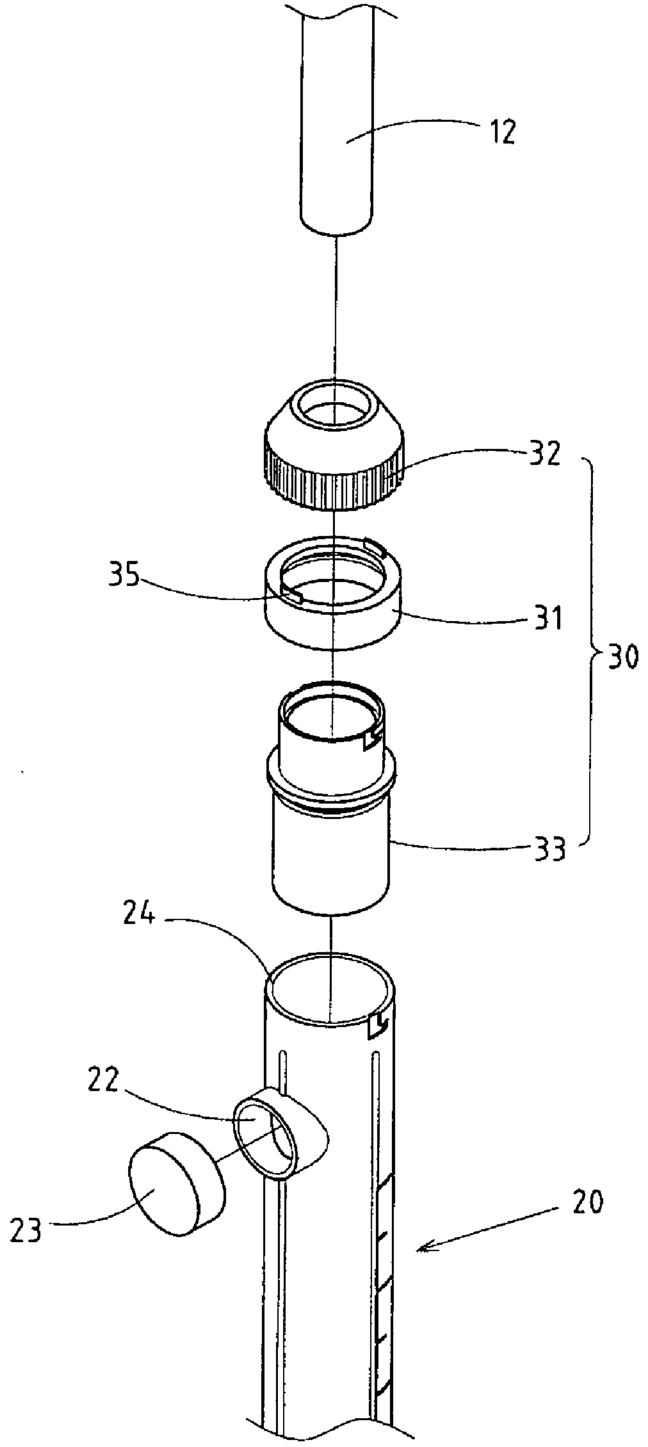
FIG. 2 shows an exploded perspective view of a detergent dispensing mechanism of the present invention.
Figure 3:
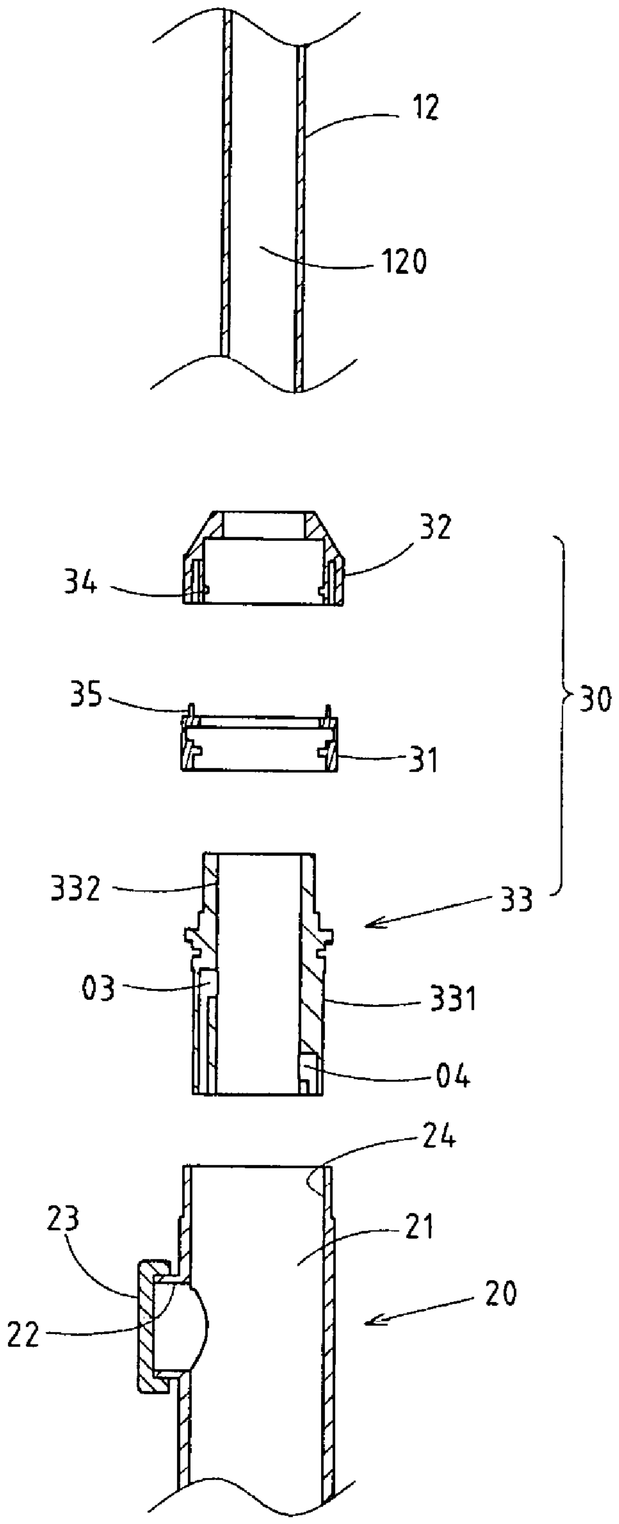
FIG. 3 shows an exploded longitudinal sectional view of the detergent dispensing mechanism of the present invention.

As shown in FIGS. 1–4, a sprinkler 10 embodied in the present invention comprises a handle 11, a barrel 12, a nozzle 13, a detergent holding portion 20, and a detergent control switch 30.

The handle 11 is provided with a hose connector 14 and a water control knob 15. The barrel 12 has a length, and a water duct 120 extending through both longitudinal ends of the barrel 12. The nozzle 13 is fastened with one longitudinal end of the barrel 12.

Figure 4:
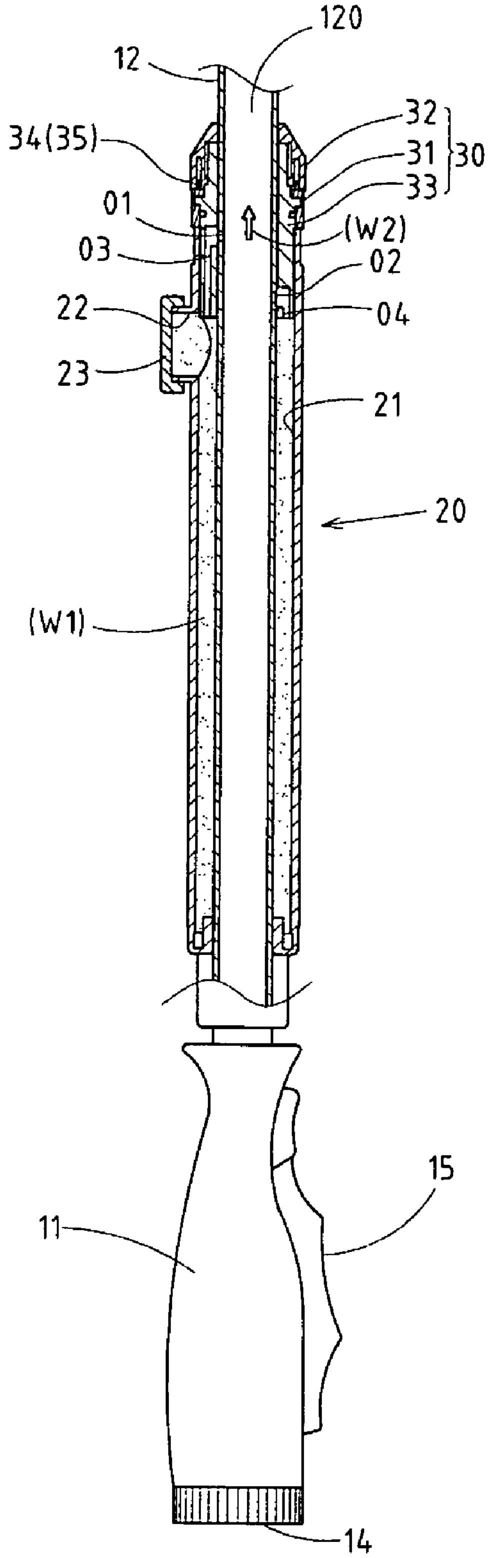
FIG. 4 shows a longitudinal sectional view of the detergent dispensing mechanism of the present invention.
Figure 5:
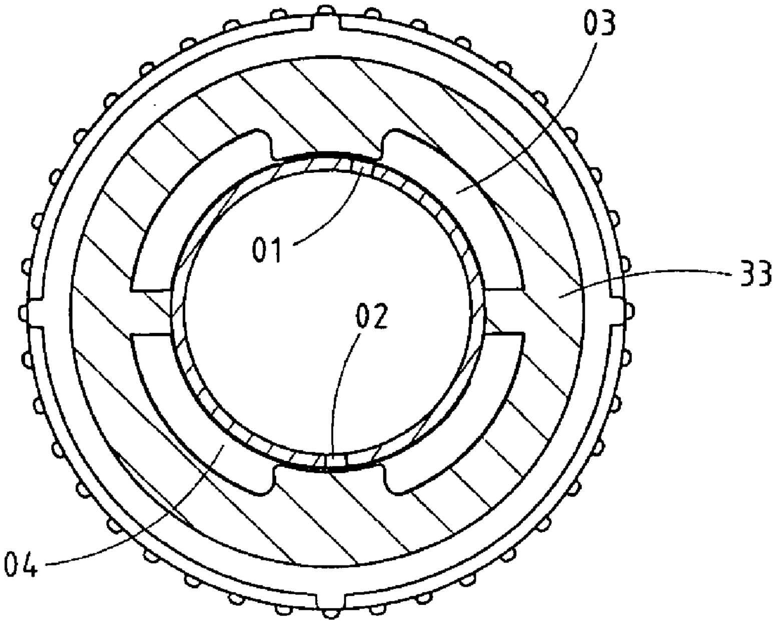
FIGS. 5, 6, and 7 are cross-sectional views of the detergent dispensing mechanism of the present invention in action.

The detergent holding portion 20 is transparent and disposed around the periphery of the barrel 12 contiguous to the handle 11. The detergent holding portion 20 is formed of a casing and a space 21 circumvented by the casing. The space 21 is used to contain a detergent W1 which is introduced thereinto via an opening 22 of the detergent holding portion 20. The opening 22 is provided with a cap 23. The detergent holding portion 20 is provided with a water hole 01 and a detergent hole 02, which are in communication with the water duct 120 of the barrel 12, as shown in FIG. 4, and are opposite in location to each other.

The detergent control switch 30 is used to open or close the water hole 01 and the detergent hole 02 of the detergent holding portion 20. The detergent control switch 30 is formed of a fastening seat 31, a control knob 32, and a guide seat 33. The guide seat 33 has a lower segment 331 and an upper segment 332. The lower segment 331 is provided with a water guide slot 03 and a detergent guide slot 04. The lower segment 331 is inserted into the space 21 of the detergent holding portion 20 via an opening 24 of the top of the detergent holding portion 20 such that the bottom end of the water guide slot 03 and the bottom end of the detergent guide slot 04 are in communication with the space 21 of the detergent holding portion 20. The lower segment 331 is secured by the fastening seat 31. The upper segment 332 is fastened with the control knob 32. As the control knob 32 is turned, the lower segment 331 of the guide seat 33 is actuated to turn in such a way that the top end of the water guide slot 03 is in communication with the water hole 01 of the detergent holding portion 20, and that the top end of the detergent guide slot 04 is in communication with the detergent hole 02 of the detergent holding portion 20.

The control knob 32 is provided with a plurality of retaining slots 34, while the fastening seat 31 is provided with a plurality of retaining projections 35. The control knob 32 is engaged with the fastening seat 31 such that the retaining projections 35 are retained in the retaining slots 34.

Figure 6:
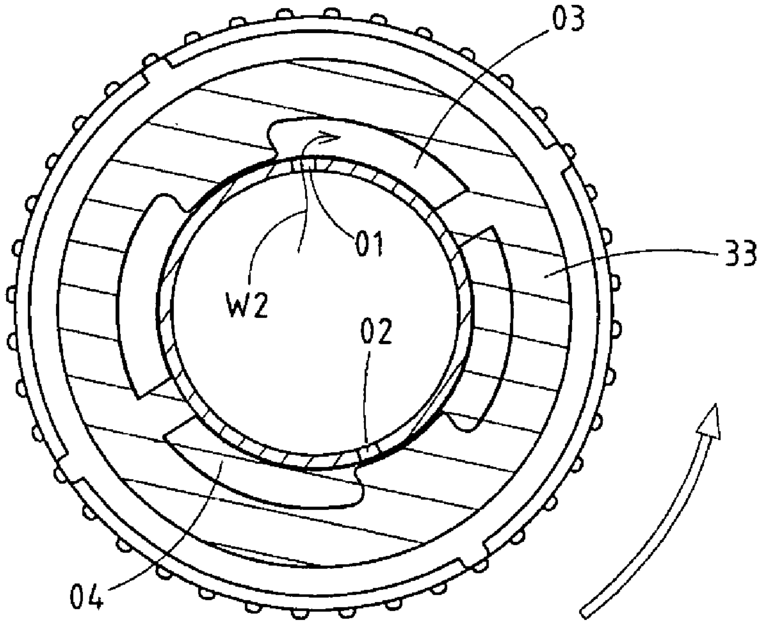
Figure 7:
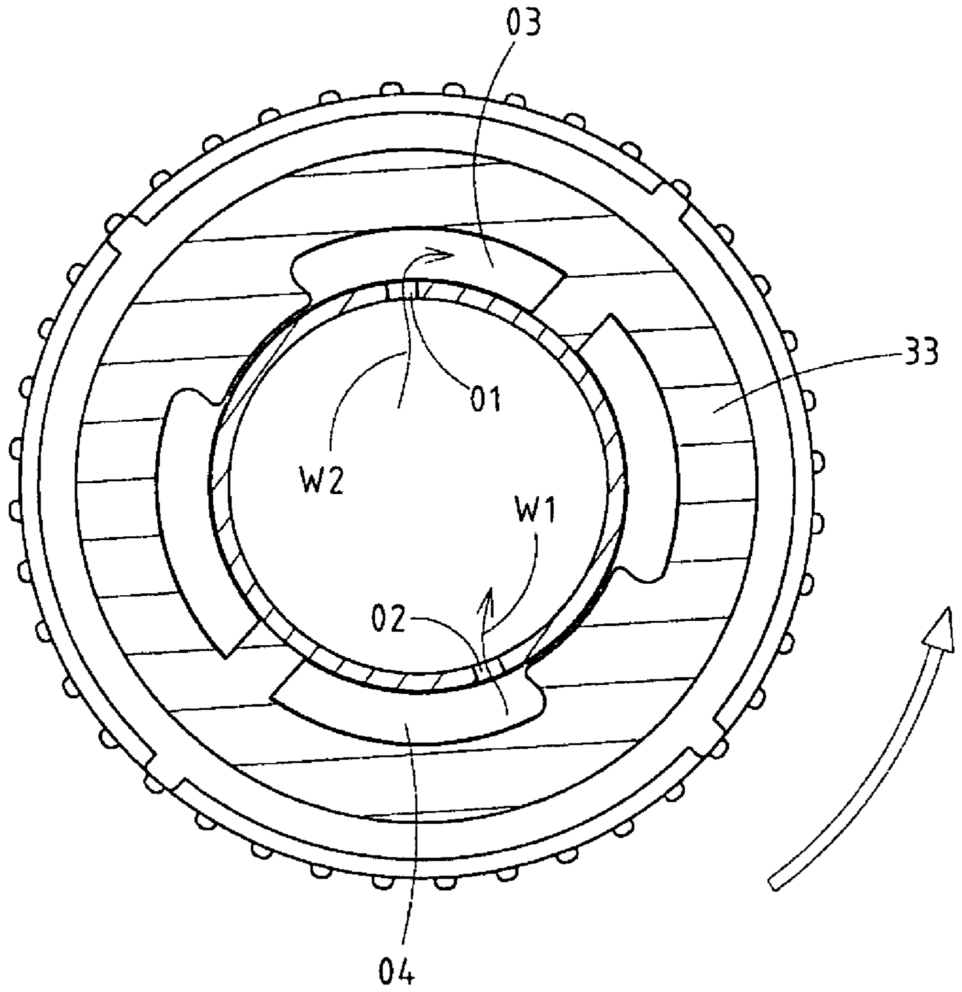

In operation, the control knob 32 is so turned that the water hole 01 of the detergent holding portion 20 is in communication with the water guide slot 03 of the lower segment 331 of the guide seat 33, as shown in FIG. 6. Thereafter, the control knob 32 is further turned in such a way that the detergent hole 02 of the detergent holding portion 20 is in communication with the detergent guide slot 04 of the lower segment 331 of the guide seat 33, as shown in FIG. 7. By turning the control knob 32 in such a manner as described above, the water W2 is first introduced into the space 21 of the detergent holding portion 20, so as to increase pressure of the detergent W1 which is contained in the space 21. As a result, when the water hole 01 of the detergent holding portion 20 is in alignment with the water guide slot 03 of the guide seat 33, the detergent W1 can be effectively forced out of the detergent hole 02 of the detergent holding portion 20 into the water duct 120 of the barrel 12.

The embodiment of the present invention described above is to be regarded in all respects as being illustrative and nonrestrictive. Accordingly, the present invention may be embodied in other specific forms without deviating from the spirit thereof. The present invention is therefore to be limited only by the scope of the following claims.

I claim:

1. A sprinkler comprising:

a handle provided with a hose connector and a water control knob;

a barrel having a longitudinal duct extending through two longitudinal ends thereof, said barrel being fastened at one of the two longitudinal ends thereof with one end of said handle;

a nozzle fastened with other one of the two longitudinal ends of said barrel; and a detergent dispensing mechanism fastened with a periphery of said barrel in such a way that said detergent dispensing mechanism is contiguous to said handle;

wherein said detergent dispensing mechanism comprises:

a transparent detergent holder provided with a space for holding a detergent, a water hole, and a detergent hole whereby said water hole and said detergent hole are in communication with said longitudinal duct of said barrel; and a detergent control switch fastened with said detergent holder for opening or closing said water hole and said detergent hole of said detergent holder; wherein said detergent control switch includes a fastening seat, a control knob, and a guide seat having a lower segment and an upper segment, wherein said lower segment of said guide seat is provided with a water guide slot and a detergent guide slot;

said lower segment of said guide seat is inserted into said space of said detergent holder such that a bottom end of said water guide slot and a bottom end of said detergent guide slot are in communication with said space of said detergent holder;

said upper segment of said guide seat is fastened with said control knob in conjunction with said fastening seat which is fastened with said lower segment of said guide seat;

said lower segment of said guide seat is actuated to turn by said control knob so that a top end of said water guide slot is in communication with said water hole of said detergent holder, and a top end of said detergent guide slot is in communication with said detergent hole of said detergent holder.

2. The sprinkler as defined in claim 1, wherein said water hole and said detergent hole of said detergent holder are opposite in location to each other; wherein said water guide slot and said detergent guide slot of said lower segment of said guide seat of said detergent control switch are opposite in location to each other; wherein said water hole of said detergent holder is first in communication with said water guide slot of said lower segment of said guide seat at the time when said control knob is initially turned in a direction; wherein said detergent hole of said detergent holder is second in communication with said detergent guide slot of said lower segment of said guide seat at the time when said control knob is further turned in the direction in which said control knob is initially turned.

* * * * *